(12) United States Patent
McAllister (10) Patent No.: US 6,651,124 B1
(45) Date of Patent: Nov. 18, 2003

(54) METHOD AND APPARATUS FOR PREVENTING DEADLOCK IN A DISTRIBUTED SHARED MEMORY SYSTEM

(75) Inventor: Curtis R. McAllister, Sunnyvale, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/560,910

(22) Filed: Apr. 28, 2000

(51) Int. Cl.$^7$ ................................................. G06F 1/00
(52) U.S. Cl. ................... 710/240; 710/200; 710/107; 710/108; 711/163
(58) Field of Search ............................. 710/240–243, 710/110, 112, 113, 118, 125, 309, 200, 107–108; 709/201, 214, 216; 711/117, 130, 131, 147, 152, 167, 120, 122, 124, 150, 163

(56) References Cited

U.S. PATENT DOCUMENTS

| | | | | |
|---|---|---|---|---|
| 4,212,057 A | * | 7/1980 | Devlin et al. ................ 711/147 |
| 5,546,391 A | * | 8/1996 | Hochschild et al. .......... 370/60 |
| 5,875,343 A | * | 2/1999 | Binford et al. ............... 710/200 |
| 5,949,980 A | * | 9/1999 | Lee et al. ..................... 710/119 |
| 5,951,663 A | * | 9/1999 | Jayakumar et al. .......... 710/107 |
| 5,966,547 A | * | 10/1999 | Hagan et al. .................. 710/77 |
| 5,983,326 A | * | 11/1999 | Hagersten et al. ........... 711/147 |
| 6,202,112 B1 | * | 3/2001 | Gadagkar et al. ............ 710/118 |
| 6,209,067 B1 | * | 3/2001 | Collins et al. ............... 711/158 |
| 6,298,418 B1 | * | 10/2001 | Fujiwara et al. ............. 711/144 |
| 6,304,932 B1 | * | 10/2001 | Ziegler et al. ............... 710/112 |
| 6,356,972 B1 | * | 3/2002 | Chin et al. ................... 710/310 |
| 6,385,676 B1 | * | 5/2002 | Adkisson ..................... 710/100 |
| 6,442,655 B1 | * | 8/2002 | Eberhard et al. ............ 711/151 |
| 6,460,133 B1 | * | 10/2002 | Nunez et al. ................ 712/214 |

\* cited by examiner

Primary Examiner—Paul R. Myers
Assistant Examiner—Raymond N. Phan (57) ABSTRACT

A distributed shared memory system having a memory access request transaction queue having a plurality of queue slots prevents occurrences of deadlocks. The distributed shared memory system is implemented in a networked multiprocessor computing system, and includes, in each coherency controller of each of the memories in the system, a mechanism to reserve at least one slot of the memory access request transaction queue for exclusive processing of processor return (PR) transactions to provide an uninterrupted processing of PR transactions. The number of blocking (BL) transaction is limited to a number less than available slots. The distributed shared memory system also includes a distributed memory return transaction queue that allows each of entries in the memory access request transaction queue to add a plurality of memory return transactions per clock cycle.

16 Claims, 5 Drawing Sheets

METHOD AND APPARATUS FOR PREVENTING DEADLOCK IN A DISTRIBUTED SHARED MEMORY SYSTEM

TECHNICAL FIELD

The invention relates to computer processors and memory systems. More particularly, the invention relates to optimizing coherent memory access operations within multiprocessor computer systems having distributed shared memory architectures.

BACKGROUND ART

Multiprocessor, or parallel processing, computer systems rely on a plurality of microprocessors to handle computing tasks in parallel to reduce overall execution time. One common implementation of a multiprocessor system is the "single bus architecture, in which a plurality of processors are interconnected through a single bus. However, because of the limited bandwidth of the single bus also limits the number of processors that can be interconnected thereto, recently networked multiprocessor systems have also been developed, which utilize processors or groups of processors connected to one another across an interconnection fabric, e.g., a network, and communicating via "packets" or messages.

Figure 1:
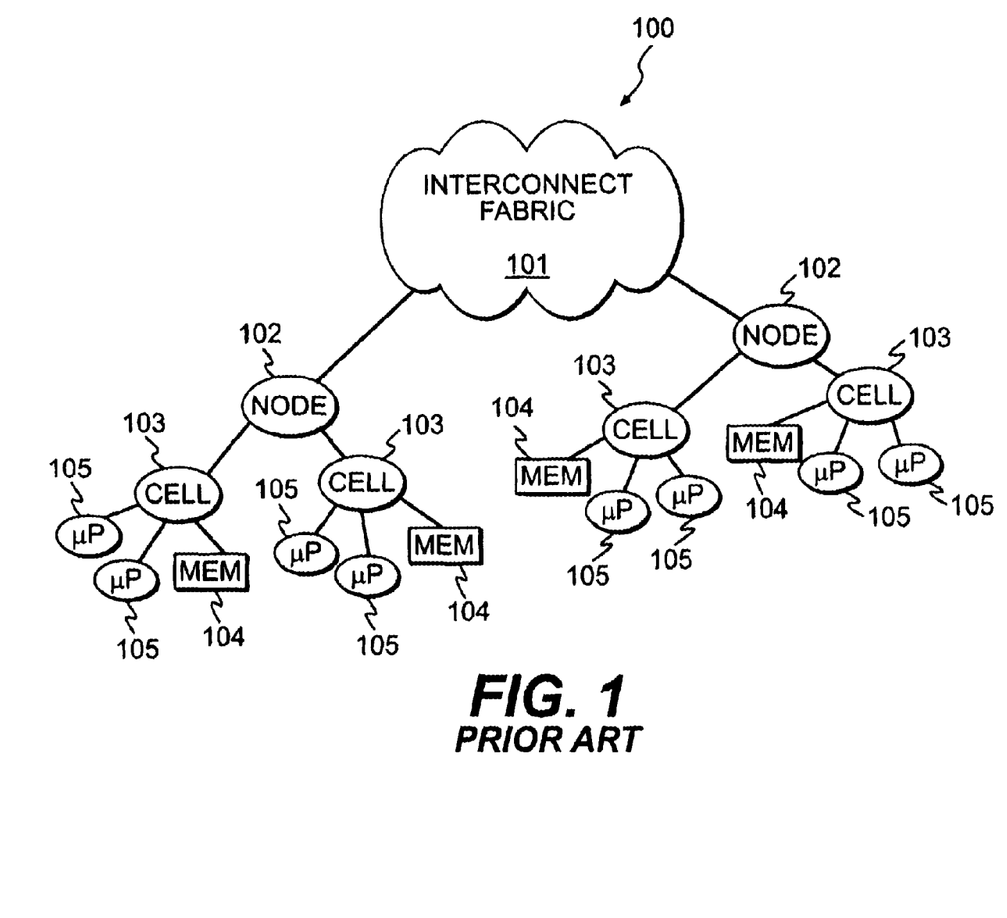
FIG. 1 is a block diagram of the relevant portions of an exemplary conventional networked multiprocessor system.

Typically, in a networked multiprocessor system includes a plurality of nodes or clusters interconnected via a network. For example, FIG. 1 shows an exemplary networked multiprocessor system 100, in which a plurality of nodes 102 are interconnected to each other via the interconnection fabric 101, e.g., a network. By way of an example, only two nodes are shown. However, the networked multiprocessor system 100 may have any number of nodes. Moreover, although, in FIG. 1, the interconnection fabric 101 is shown to provide interconnections only between the nodes 102, all system entities, including the cells 103, the processors 105 and the memories 104, are interconnected, and communicate, with the rest of the system through the interconnection fabric 101.

Each of the nodes 102 of the networked multiprocessor system 100 may be further divided into a smaller hierarchical units—referred herein as "cells" 103—, which comprises a plurality of processors 105 and a shared memory 104. Each processor 105 may comprise any processing elements that may share data within the distributed shared memory in the system, e.g., a microprocessor, an I/O device or the like. The grouping into nodes and/or cells of the system entities may be made physically and/or logically.

Each of the shared memory 104 may comprise a portion of the shared memory for the system 100, and may include a memory controller and/or a coherency controller (not shown) to control memory accesses thereto from various processors in the system, and to monitor the status of local copies of the memory stored in caches in various processors in the system using a coherency directory that are maintained in each node or within each cell.

Figure 2:
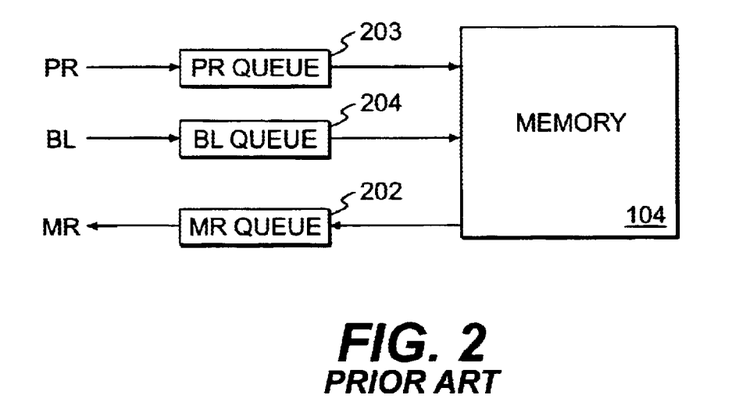
FIG. 2 is a block diagram of the relevant portions of an exemplary conventional memory access transaction queue system.

As shown in FIG. 2, a typical shared memory 104 receives memory request packets through the blocking (BL) queue 204, receives response packets from processors 105 through the processor return (PR) queue 203, and sends memory return packets in response to the memory requests through the MR queue 202. The PL/BL queue 201 is a buffer to hold incoming memory requests, where a BL transaction is a transaction involving a memory access request to the shared memory 104, e.g., a memory read transaction, and where a PR transaction is a transaction involving a response from a processor 105 in response to a coherency check request from a shared memory 104 and/or a write back of a copy of a cache line in its cache back to the memory 104.

One significant problem that exists with many networked computer systems is that of deadlock, where nodes may in effect "lock up" due to an inability to pass packets or messages to other nodes. In particular, in some networked computer systems, sending a primary request to another node may result in the receiving or destination node sending out one or more secondary requests, e.g., to notify other nodes having local copies of a memory block that the copies of the memory block in their respective caches must be marked invalid (often referred to as "invalidation" requests). However, if one or more secondary requests cannot be sent by the destination node, the node may block receipt of new requests from other nodes. This may result in two nodes each waiting for responses from the other.

For example, if a shared memory 104 receives a BL transaction, e.g., a memory read request from a processor, the memory 104 may send a MR request, e.g., a coherency check request, to other processor(s) to ensure that no copies of the requested data reside in caches of other processor(s). The shared memory 104 then must wait for processor responses (PR) from the other processor(s) before it can issue a MR transaction that satisfies the memory read request. However, if the MR transaction to other processors could not be issued, e.g., because the MR queue is full at the time, then no other transaction can be received by the shared memory 104, and thus a deadlock occurs.

For optimal performance of the shared memory system, it is crucial that the exchange of packets among the processors and shared memories continuously flow.

Prior attempts to address the deadlock problem includes provision of MR queues which can hold as many memory return transactions as BL transactions in the PR/BL queue may generate. Unfortunately, however, this approach requires a large buffer area. The control logic necessary to control this larger buffer area also becomes very large and complex, and thus is more difficult to design and too slow to operate.

Moreover, because the number of PR transactions and the number of BL transactions that can be processed at any given time are each fixedly arranged and independent with respect to each other, a conventional shared memory system cannot dynamically adapt to process more of BL transactions or more of the PR transactions as the realtime need may require, and is thus inflexible.

Another prior attempt to address the deadlock problem is to provide a special entry type dedicated to handle writeback PR transactions. This approach requires an additional design effort, which is difficult, often "bug prone", and the resulting design is often very inflexible.

Moreover, conventional memory access transaction queues allow only one MR transaction to be added per clock cycle, and thus are inefficient.

Thus, there is a need for more efficient method and device for memory access in a distributed shared memory system, which prevents occurrences of deadlocks, which does not require a large MR queue, and which does not require a design of a special dedicated entries for write back transactions.

There is also a need for more flexible method and device for memory access in a distributed shared memory system that may be dynamically adaptive to the current requirement for processing various memory access transactions.

There is also a need for a distributed queuing mechanism that allows multiple addition of entries in a clock cycle.

SUMMARY OF INVENTION

In accordance with the principles of the present invention, a method of preventing a deadlock in a distributed shared memory system having a memory access request transaction queue having a plurality of queue slots comprises preventing a blocking flow control class transaction from being processed in at least one of the plurality of queue slots.

In addition, in accordance with the principles of the present invention, an apparatus for preventing a deadlock in a distributed shared memory system having a memory access request transaction queue having a plurality of queue slots comprises a coherency controller configured to prevent a blocking flow control class transaction from being processed in at least one of the plurality of queue slots.

In accordance with another aspect of the principles of the present invention, a method of providing a distributed memory return transaction queue in a distributed shared memory system having a memory access request transaction queue processing one or more entries comprises providing each of the one or more entries a plurality of addition lines, providing a global pointer that indicates a last occupied position in the distributed memory return transaction queue, providing a plurality of entry pointers each associated with the one or more entries, and allowing each of the one or more entries to add one or more memory return transaction at locations in the distributed memory return transaction queue based on the global pointer and associated ones of the plurality of entry pointers through the a plurality of addition lines during a clock cycle.

DESCRIPTION OF DRAWINGS

Features and advantages of the present invention will become apparent to those skilled in the art from the following description with reference to the drawings, in which.

DETAILED DESCRIPTION OF PREFERRED EMBODIMENTS

For simplicity and illustrative purposes, the principles of the present invention are described by referring mainly to an exemplar embodiment thereof. However, one of ordinary skill in the art would readily recognize that the same principles are equally applicable to, and can be implemented in, a multiprocessor shared memory system having a different implementation or architecture, and that any such variation would be within such modifications that do not depart from the true spirit and scope of the present invention.

For example, while much of the following description of the present invention makes references to multiprocessor systems, it should be appreciated that the concept of distributing tasks between processors in multiprocessor systems may also be applied to distributed computer systems which distribute tasks between different computers in a networked environment (e.g., a LAN or WAN). Further, many of the functions and problems associated with multiprocessor and distributed computer systems are quite similar and equally applicable to both types of systems. Consequently, the term "networked computer system" will be used hereinafter to describe both systems in which the nodes are implemented as individual microprocessors or groups of processors (multiprocessor systems) or as individual computers which may separately utilize one or more processors (distributed computer systems).

In accordance with the principles of the present invention, a distributed shared memory system having a memory access request transaction queue having a plurality of queue slots prevents occurrences of deadlocks. The distributed shared memory system is implemented in a networked multiprocessor computing system, and includes, in each coherency controller of each of the memories in the system, a mechanism to reserve at least one slot of the memory access request transaction queue for exclusive processing of processor return (PR) transactions to provide an uninterrupted processing of PR transactions. The number of blocking (BL) transaction is limited to a number less than available slots.

The inventive distributed shared memory system also includes a distributed memory return transaction queue that allows each of entries in the memory access request transaction queue to add a plurality of memory return transactions per clock cycle.

In accordance with the principles of the present invention, the coherency system for the networked multiprocessor system divides the packet transactions traffic into, inter alia, three general flow control classes as shown in table 1:

TABLE 1

Flow control class dependencies

| Class | Can Generate |
|---|---|
| Blocking (BL) | Memory Return (MR) |
| Memory Return (MR) | Processor Return (PR) |
| Processor Return (PR) | Memory Return (MR) |

A BL transaction is a transaction involving a memory access request to the shared memory 104, e.g., a memory read transaction, and where a PR transaction is a transaction involving a response from a processor 105 in response to a coherency check request from a shared memory 104 and/or a write back of a copy of a cache line in its cache back to the memory. As shown in the table, the flow control classes have dependency relationships, in which a BL transaction can generate another MR transaction, which may in turn generate a PR transaction, which can also generate yet another MR transaction. This can be shown pictorially as BL→MR→PR (→MR), where "→" is read "can generate".

In accordance with the principles of the present intention, a deadlock is prevented by ensuring that the PR flow control class never be blocked. Since accesses to the shared memory by the coherency controller are dependent only upon availability of sufficient memory bandwidth, write-back transactions can be processed as long as there are available slots in the memory access transaction queue, i.e., the PR/BL queue 201 (shown in FIG. 3). The PR/BL queue 201 is a fixed length buffer that has n number of slots. In a preferred embodiment of the present invention, the PR/BL queue 201 comprises 28 slots, and thus may process only 28 transactions of either BL or PR flow control class at any given time.

Figure 3:
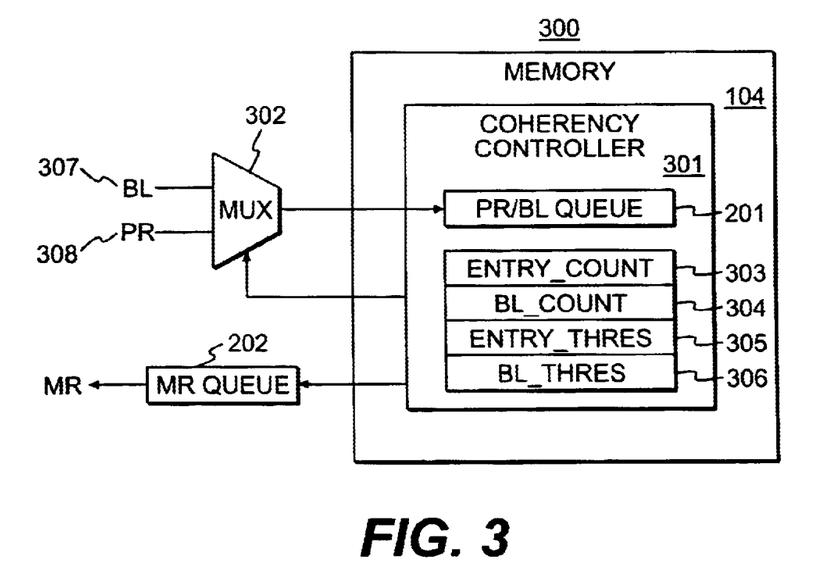
FIG. 3 is a block diagram of the relevant portions of an embodiment of the memory access transaction queue mechanism in a distributed shared memory system in accordance with the principles of the present invention.

When the PR/BL queue 201 is filled up, no other transactions can be received, and thus the PR/BL queue 201 must be stalled. In accordance with the principles of the present invention, to ensure that PR write-back transactions can be processed, at least one of the PR/BL queue slot must be reserved for exclusive processing of the PR flow control class transactions.

In particular, FIG. 3 shows an embodiment of the inventive memory access transaction queue system 300, which comprises a shared memory 104 that includes a coherency controller 301, MR queue 202, multiplexer 302 and a coherency controller 301. The multiplexer 302 receives a BL transaction input 307 and a PR transaction input 308, and selects one of the two inputs based on a control signal received from the coherency controller 301. BL transactions 307 and PR transactions 308 may be inputted to the multiplexer 302 through respective input buffers, e.g., similar to the BL queue 204 and the PR queue 203 shown in FIG. 2, respectively. The coherency controller 301 includes a PR/BL queue 201 that receives the transactions output from the multiplexer 302 and four registers 303,304,305 and 306, in which are stored the "Entry_Count", "BL_Count", "Entry_Threshold" and "BL_Threshold", respectively.

The "Entry_Count" register 303 holds a number indicative of the number of entries of all types that are currently in the PR/BL queue 201. The "BL_Count" register 304 hold a number indicative of the number of entries containing BL transactions currently in the PR/BL queue 201. The "Entry_Threshold" register 305 and the "BL_Threshold" register 306 hold the maximum number of entries allowed to be processed and the maximum number of entries containing BL transaction allowed to be processed in the PR/BL queue 201, respectively, both thresholds of which are configurable by a user of the networked multiprocessor system and/or by system software.

The Entry_Threshold is selected to be less than the number of slots available in the PR/BL queue 201, e.g., 28 in the preferred embodiment of the present invention. The BL_Threshold in turn is selected to be less than the Entry_Threshold.

The coherency controller 301 asserts an appropriate signal (s) to the multiplexer 302 to pass a PR transaction to the PR/BL queue 201 as long as the Entry_Count is less than the Entry_Threshold, and to pass a BL transaction if the BL_Count is less than the BL_Threshold and the Entry_count is less than the Entry_threshold. Thus, at least one PR/BL queue slot may be reserved for PR transactions at any given time.

Figure 4:
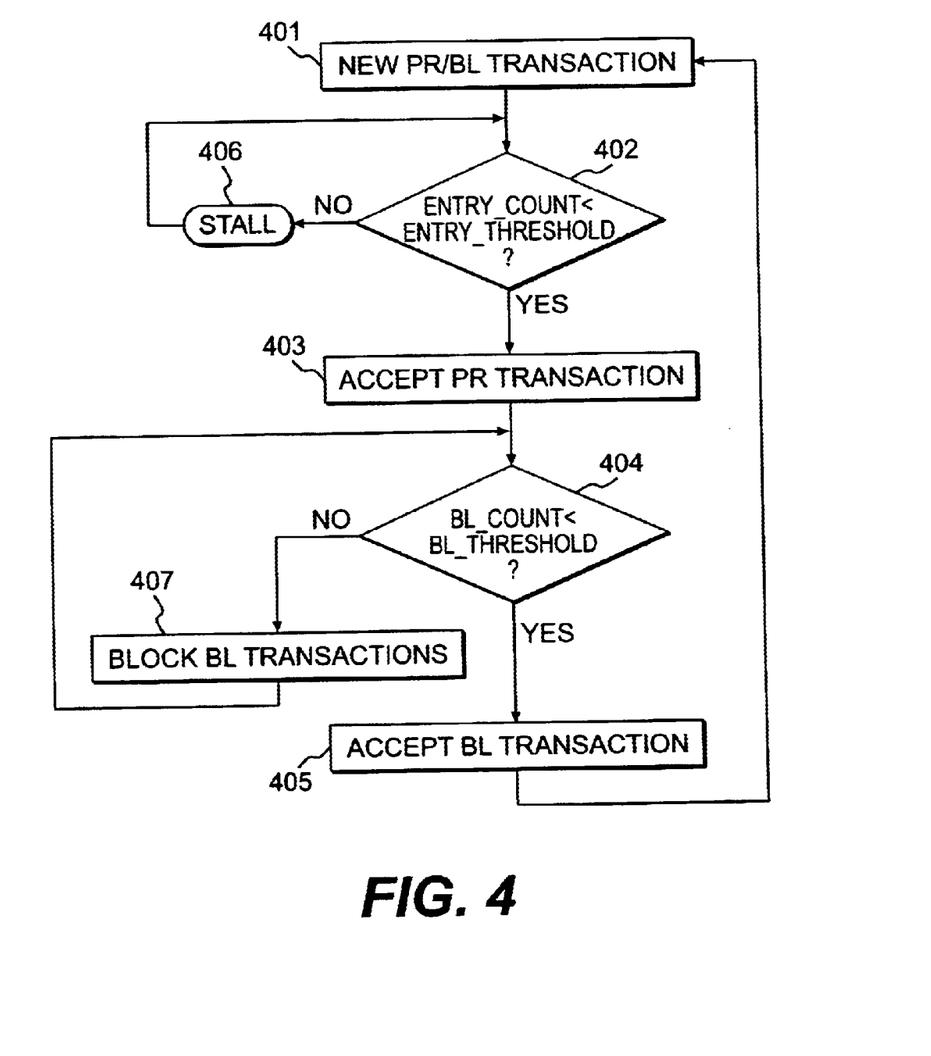
FIG. 4 is an illustrative flow diagram showing an exemplary embodiment of the memory access transaction queue process in accordance with the principles of the present invention.

In particular, FIG. 4 shows a flow diagram describing the operations of the coherency controller 301. In step 401, one or more new transaction of either PR or BL flow control class is received at the input(s) of the multiplexer 302. In step 402, the coherency controller 301 examines the current Entry_Count, and compares the same with the Entry_Threshold to determine if the Entry_Count is less than the Entry_Threshold.

If the Entry_Count is not less than the Entry_Threshold, e.g., if they are equal, then the PR/BL queue 201 is made to stall, i.e., no more new transactions are accepted by the queue, in step 406, until one or more entries are processed and retires from the PR/BL queue 201, and new slots are freed up, i.e., the Entry_Count becomes less than the Entry_Threshold as shown.

If, on the other hand, the current Entry_Count is less than the Entry_Threshold, and if at least one of the one or more new transactions received is a PR transaction, the coherency controller 301 sends, in step 403, a signal to the multiplexer 302 to allow the PR transaction to pass through to the PR/BL queue 201, and the PR transaction is accepted.

In step 404, if at least one of the one or more new transactions received is a BL transaction, the coherency controller 301 examines the current BL_Count, and compares the same with the BL_Threshold to determine if the BL_Count is less than the BL_Threshold.

If the BL_Count is not less than the BL_Threshold, e.g., if they are equal, then the PR/BL queue 201 is made to block any new BL transactions are accepted by the queue, in step 407, until one or more BL transactions are processed and retires from the PR/BL queue 201 so that the BL_Count once again becomes less than the BL_Threshold as shown.

If, on the other hand, the current BL_Count is less than the BL_Threshold, the coherency controller 301 sends, in step 405, a signal to the multiplexer 302 to allow the BL transaction to pass through to the PR/BL queue 201, and the BL transaction is accepted. The entire process is repeated when a new transaction is received at the multiplexer 302.

As can be appreciated, the inventive memory access request transaction queue and the coherency controller in the foregoing description provides a distributed shared memory system, in which occurrences of deadlocks are prevented without the need for a large MR queue or a design of a special dedicated entries for write back transactions.

In addition to write-back transactions, the PR/BL queue may contain responses to recalls issued as a result of BL transactions in the queue. Processing of a recall response for an entry may cause that entry to generate a MR data return. Therefore, a MR data return may need to be queued up for as many as the BL_Threshold. Moreover, MR data returns may also result from, inter alia, directory tags and data returning from the memory, BL transaction linked list advances, and timeouts. All of these MR data returns may occur during the same clock cycle. Thus, up to four additions could be made to the MR queue in each clock cycle. The MR queue may advance in any clock cycle, removing the oldest entry from the queue, i.e., first-in-first-out (FIFO).

In accordance with the principles of the present invention, the above described MR queuing needs are met by a distributed queue mechanism, in which up to four (4)additions and zero (0) or one (1) deletions are allowed to be made during a clock cycle. The state components of an embodiment of the distributed queue mechanism are two pointers, global_queue_pos and entry_queue_pos, both of which are implemented as seven (7) bit counters in the preferred embodiment of the present invention.

One of the two counters is referred to herein as the "entry_queue_pos counter", and is provided for each of the entries that may cause a MR data return. Each of the entry_queue_pos counters outputs a count value, entry_queue_pos, the two's complement of which represents the position of the associated entry on the distributed queue. A value of zero of the entry_queue_pos indicates that the entry is the oldest entry in the distributed queue, or is located at the front of the distributed queue. A negative value of the entry_queue_pos indicates the entry is not in the distributed queue. A positive value of the entry_queue_pos indicate that the entry is in the distributed queue at a location other than the front of the queue, a larger the positive count value indicates that the entry is positioned further back in the distributed queue.

The other of the two counters is referred to herein as the "global_queue_pos counter", and outputs a count value, global_queue_pos, which represents the position of the highest numbered, i.e., the newest, entry in the distributed queue. A negative value of global_queue_pos indicates no entries are in the distributed queue. A value of 0 indicates one entry on the distributed queue. Whenever a new value is updated, i.e., counted up or down, the updated value of the global_que_pos is broadcast to all entries.

In this exemplary embodiment, each entry drives four add lines, add[3:0], corresponding to the four types of events that may cause simultaneous adds as previously described. These add lines have a fixed priority order associated thereto, with add[3] being the highest priority and add [0] being the lowest.

Figure 5:
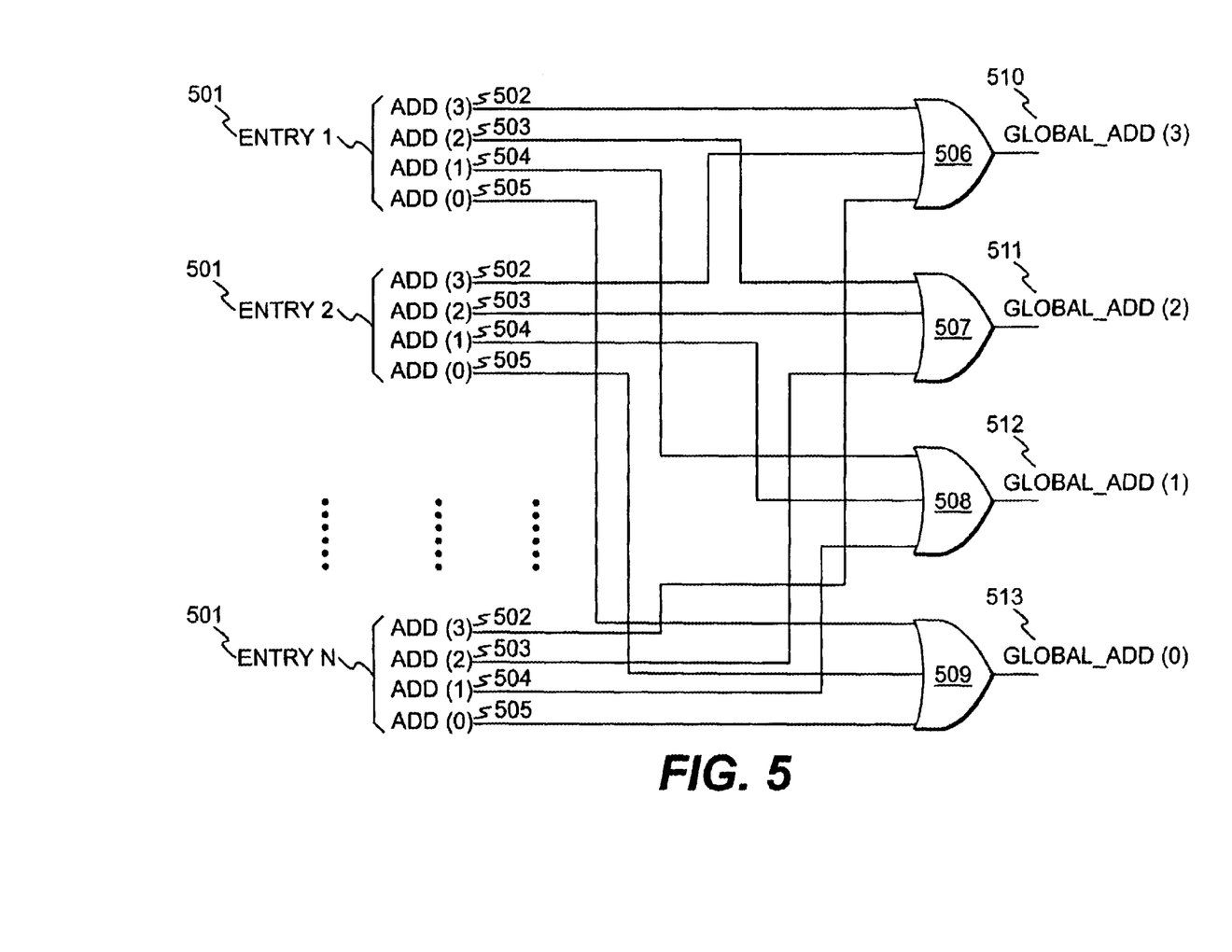
FIG. 5 is an illustrative logic diagram showing an exemplary embodiment of the circuit for generating global addition signals in accordance with the principles of the present invention.
Figure 6:
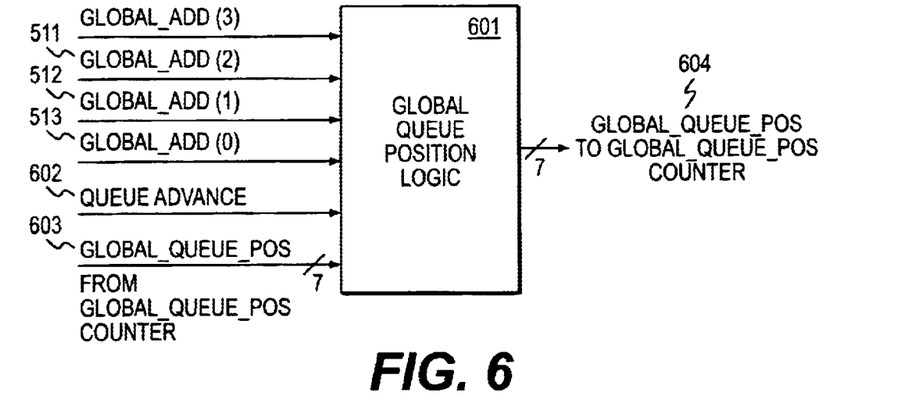
FIG. 6 is a block diagram showing input and output signals of an exemplary embodiment of the global queue position logic in accordance with the principles of the present invention.

As shown in FIG. 5, each of the add lines add[3] 502 from all entries, entry 1 to entry n 501, are logically ORed together with an OR gate 506 to produce the Global_Add [3] 510, each of the add lines add[2] 503 from all entries are ORed together with an OR gate 507 to produce the Global_Add [2] 511, each of the add lines add[1] 504 from all entries are ORed together with an OR gate 508 to produce the Global_Add [1] 512, each of the add lines add[0] 505 from all entries are ORed together with an OR gate 509 to produce the Global_Add [0] 513. In an embodiment of the present invention, a queue advance signal is provided to indicate that the distributed queue is advancing, In an embodiment of the present invention, a global queue position logic as shown in FIG. 6 is provided to recalculate the value of the global_queue_pos during each clock cycle. In particular, as shown in FIG. 6, the global queue position logic 601 receives the Global_Add [3:0] 510–513, the queue advance signal 602 and the seven bit current value of the global_queue_pos 603 from the global_queue_pos counter. The global queue position logic adds the number of additions as reflected in the received Global_Add [3:0] 510–513 to determine the number of newly added MR transactions. If the queue advance signal is active, i.e., if the distributed queue is advancing, the global queue position logic subtracts 1 from the number of newly added MR transactions. If the queue advance signal is inactive, no subtraction from the number of newly added MR transactions is made.

The resulting number of newly added MR transactions, i.e., after taking the queue advance signal into account, is then added to the current global_queue_pos 603 to arrive at the new global_queue_pos value 604, which is stored in the global_queue_pos counter, and is also broadcasted to each of the entries.

Figure 7:
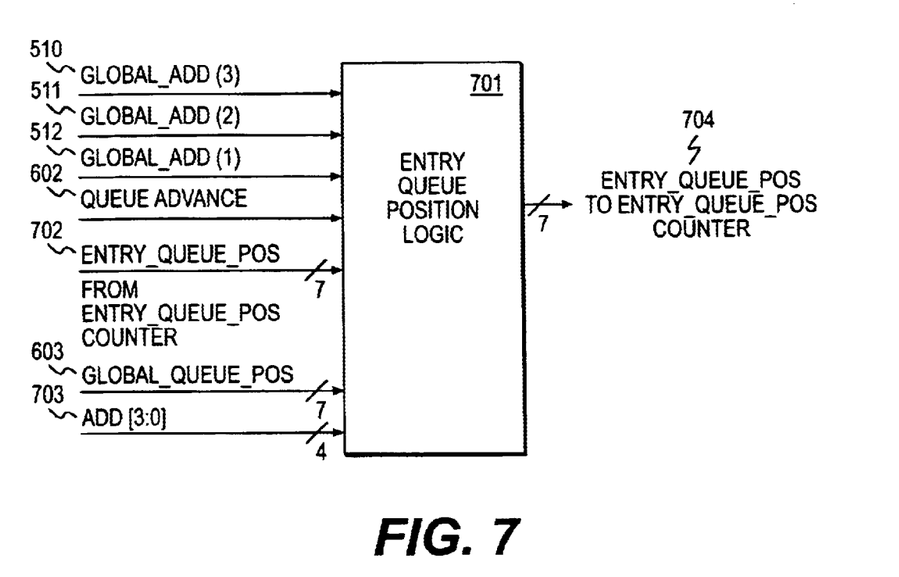
FIG. 7 is a block diagram showing input and output signals of an exemplary embodiment of the entry queue position logic in accordance with the principles of the present invention.

Additionally, during each clock cycle, location of each of the entries in the distributed queue is recalculated in its associated entry queue position logic, and exemplary implementation of which is shown in FIG. 7. An entry queue position logic 701 is provided for each of the entries. For each entry, during each clock cycle, the associated entry queue position logic 701 receives the Global_Add [3:1] 510–512, the queue advance signal 602, the seven bit current value of the entry_queue_pos 702 from the global_queue_pos counter, the current global_queue_pos value 603 and the four add lines associated with the entry, Add [3:0] 703, i.e., adddition lines 502–505 shown in FIG. 5, and outputs a seven bit new entry_queue_pos value 704 to be stored in the entry_queue_pos counter.

The calculation of the new entry_queue_pos 704 depends on whether or not the entry is already on the distributed queue. If, based on the current entry_queue_pos value 702, the entry is already on the queue, the entry queue position logic decrements the entry's queue position by 1 if the queue advance signal 602 is active, i.e., the distributed queue is advancing, and maintains the current position of the entry if the queue advance signal 602 is inactive.

If, on the other hand, the entry is not already in the distributed queue, the current negative entry_queue_pos value is maintained if no additions are being made during the current clock cycle. If the entry is not already in the distributed queue, but the entry is adding new MR transactions, the entry queue position logic 701 calculates the new entry_queue_pos value 704 as follows:

The entry queue position logic 701 adds the value of all Global_Add[3:1] 510–512 with a higher priority than the Add[3:0] 703 to arrive at an add value. If the queue advance signal 602 is active, the entry queue position logic 701 subtracts 1 from the add value. If the resulting add value is −1, then the global_que_pos 604 is the next entry_que_pos 704. If the resulting add value is 0 or greater, then the next entry_que_pos 704 is chosen to be the global_que_pos 604 plus (the add value +1), i.e., {(global_que_pos)+ (add value+1)}.

As can be appreciated, the distributed queue mechanism in the foregoing description allows up to four new MR transactions to added by each entry during a clock cycle.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A method of preventing a deadlock in a distributed shared memory system having a memory access request transaction queue having a plurality of queue slots, comprising:

preventing a blocking flow control class transaction from being stored in at least one of said plurality of queue slots;

storing a processor return flow control class transaction in said at least one of said plurality of queue slots;

providing a blocking flow control class transaction threshold indicating a maximum number of blocking flow control class transactions allowed to be processed in said memory access request transaction queue; and preventing said memory access request transaction queue from accepting any new blocking flow control class transaction if a current number of blocking flow control class transactions already in said memory access request transaction queue is not less than said blocking flow control class transaction threshold.

2. The method of preventing a deadlock in accordance with claim 1, further comprising:

provide an entry threshold indicating a maximum number of entries allowed to be processed in said memory access request transaction queue; and preventing said memory access request transaction queue from accepting any new entry if a current number of entries already in said memory access request transaction queue is not less than said entry threshold.

3. The method of preventing a deadlock in accordance with claim 2, wherein:

each of said entry threshold and said blocking flow control class transaction threshold is configurable by at least one of a user of said distributed shared memory system and a system software; and wherein said entry threshold and said blocking flow control class transaction threshold are each selected so that said blocking flow control class transaction threshold is less than said entry threshold.

4. An apparatus for preventing a deadlock in a distributed shared memory system having a memory access request transaction queue having a plurality of queue slots, comprising:

a coherency controller configured to prevent a blocking flow control class transaction from being stored in at least one of said plurality of queue slots;

said coherency controller is configured to store a processor return flow control class transaction in said at least one of said plurality of queue slots;

a first register configured to store a blocking flow control class transaction threshold indicating a maximum number of blocking flow control class transactions allowed to be processed in said memory access request transaction queue; and wherein said coherency controller is configured to prevent said memory access request transaction queue from accepting any new blocking flow control class transaction if a current number of blocking flow control class transactions already in said memory access request transaction queue is not less than said blocking flow control class transaction threshold.

5. The apparatus for preventing a deadlock according to claim 4, further comprising:

a second register configured to store an entry threshold indicating a maximum number of entries allowed to be processed in said memory access request transaction queue; and wherein said coherency controller is configured to prevent said memory access request transaction queue from accepting any new entry if a current number of entries already in said memory access request transaction queue is not less than said entry threshold.

6. The apparatus for preventing a deadlock according to claim 5, wherein:

each of said entry threshold and said blocking flow control class transaction threshold is configurable by at least one of a user of said distributed shared memory system and a system software; and wherein said entry threshold and said blocking flow control class transaction threshold are each selected so that said blocking flow control class transaction threshold is less than said entry threshold.

7. A method of providing a distributed memory return transaction queue in a distributed shared memory system having a memory access request transaction queue processing one or more entries, comprising:

providing each of said one or more entries a plurality of addition lines;

providing a global pointer that indicates a last occupied position in said distributed memory return transaction queue;

providing a plurality of entry pointers each associated with said one or more entries; and allowing each of said one or more entries to add one or more memory return transaction at locations in said distributed memory return transaction queue based on said global pointer and associated ones of said plurality of entry pointers through said a plurality of addition lines during a clock cycle.

8. The method of providing a distributed memory return transaction queue in accordance with claim 7, further comprising:

assigning a priority value to each of said plurality of add lines of each of said one or more entries to provide each of said one or more entries to have said plurality of addition lines that range from a highest priority addition line to a lowest priority addition line.

9. The method of providing a distributed memory return transaction queue in accordance with claim 8, further comprising:

recalculating said global pointer during said clock cycle.

10. The method of providing a distributed memory return transaction queue in accordance with claim 9, further comprising:

recalculating said plurality of entry pointers during said clock cycle.

11. The method of providing a distributed memory return transaction queue in accordance with claim 10, wherein said step of recalculating said global pointer comprises:

ORing together respective ones of said plurality of addition lines having an identical priority value from each of said one or more entries to produce a plurality of global addition lines;

providing a queue advance signal indicating whether said distributed memory return transaction queue is advancing;

adding a sum of values of said plurality of global addition lines to said global pointer to produce a number of new additions; and setting a recalculated global pointer to be said sum if said queue advance signal indicates that said distributed memory return transaction queue is not advancing.

12. The method of providing a distributed memory return transaction queue in accordance with claim 11, wherein said step of recalculating said global pointer further comprises:

subtracting a one from said sum to produce an adjusted sum if said queue advance signal indicates that said distributed memory return transaction queue is advancing; and setting a recalculated global pointer to be said adjusted sum if said queue advance signal indicates that said distributed memory return transaction queue is advancing.

13. The method of providing a distributed memory return transaction queue in accordance with claim 12, wherein said step of recalculating said plurality of entry pointers comprises:

determining whether respective ones of said one or more entries are already in the distributed memory return transaction queue based on said plurality of entry pointers; and setting, if said respective ones of said one or more entries are determined to be already in the distributed memory return transaction queue, each of said plurality of entry pointers associated with ones of said one or more entries that are already in said distributed memory return transaction queue to remain unchanged if said queue advance signal indicates that said distributed memory return transaction queue is not advancing.

14. The method of providing a distributed memory return transaction queue in accordance with claim 13, wherein said step of recalculating said plurality of entry pointers further comprises:

subtracting a one from each of said plurality of entry pointers associated with ones of said one or more entries that are already in said distributed memory return transaction queue if said queue advance signal indicates that said distributed memory return transaction queue is advancing.

15. The method of providing a distributed memory return transaction queue in accordance with claim 13, wherein said step of recalculating said plurality of entry pointers comprises:

setting, if said respective ones of said one or more entries are not already in the distributed memory return transaction queue, each of said plurality of entry pointers associated with ones of said one or more entries that are not already in said distributed memory return transaction queue to remain unchanged if said one or more entries that are not already in said distributed memory return transaction queue are not adding any new memory return transaction.

16. The method of providing a distributed memory return transaction queue in accordance with claim 15, wherein said step of recalculating said plurality of entry pointers further comprises:

adding each of global addition lines of each said plurality of entry pointers associated with ones of said one or more entries that are not already in said distributed memory return transaction queue that have higher priority value than respective ones of asserted addition lines of said one or more entries that are not already in said distributed memory return transaction queue to produce an addition value;

adding a one to said addition value if said queue advance signal indicates that said distributed memory return transaction queue is advancing to produce an adjusted addition value, said adjusted addition value being equal to said addition value if said queue advance signal indicates that said distributed memory return transaction queue is not advancing; and setting each of recalculated plurality of entry pointers associated with ones of said one or more entries that are not already in said distributed memory return transaction queue to be a sum of said recalculated global pointer and said adjusted addition value.

* * * * *